Aug. 2, 1960
J. G. BEHRENDT
2,947,420
HAT RACK
Filed Oct. 14, 1957
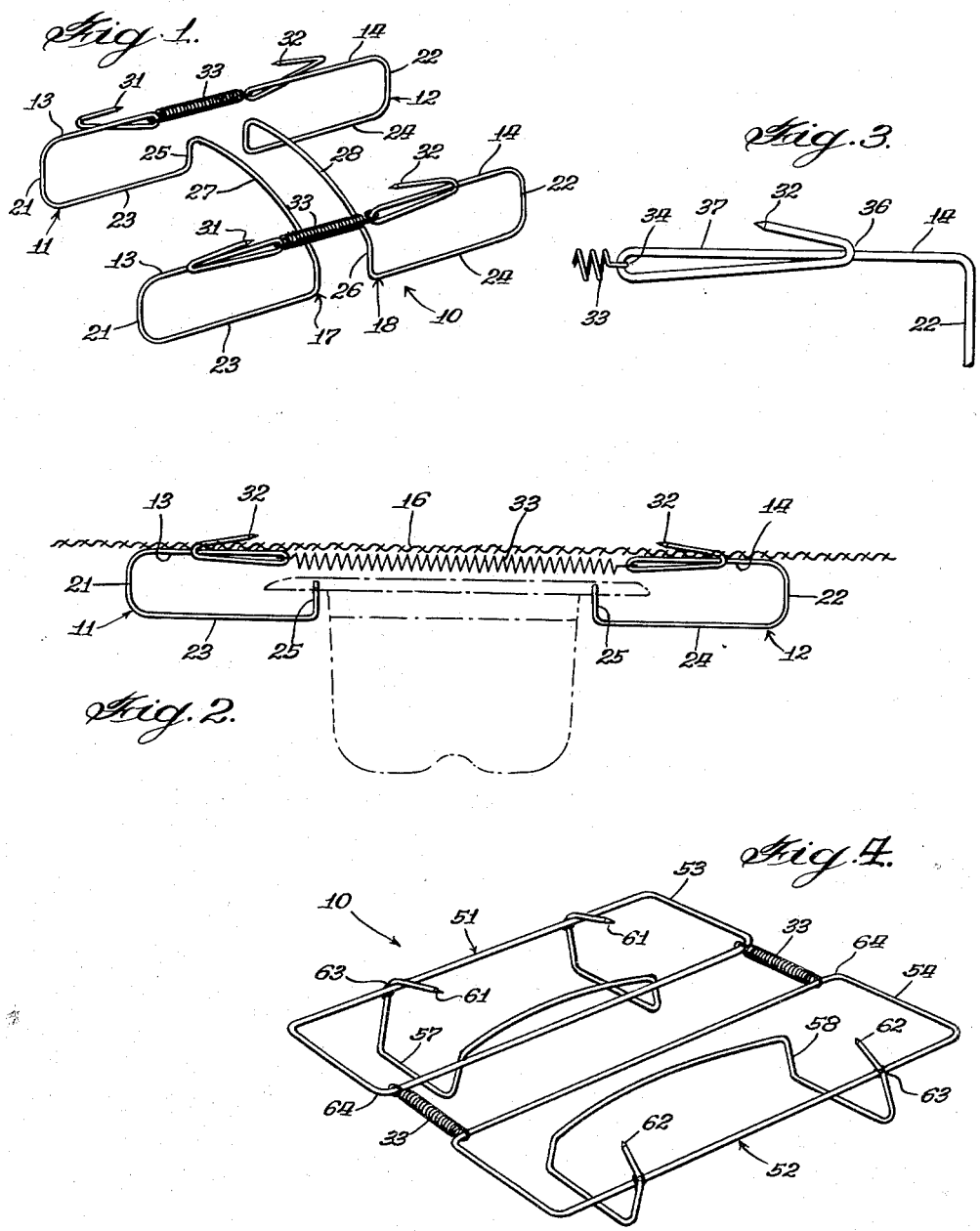
Inventor:
John G. Behrendt
By Wigner L. Stone
Atty.

2,947,420
Patented Aug. 2, 1960

2,947,420

HAT RACK

John G. Behrendt, % A. J. Petersen, 3413 W. North Ave., Chicago 47, Ill.

Filed Oct. 14, 1957, Ser. No. 689,872

2 Claims. (Cl. 211—31)

The invention relates to a new and improved hat rack which can be quickly and conveniently affixed to any pin-receiving surface such as the interior of the roof of an automobile.

It is a general object of the invention to provide a hat rack which is simple and efficient, and which facilitates its rapid and convenient securement to the ceiling of an automobile interior or other pin-receiving surface.

Another object of the invention is to provide a hat rack that is maintained securely in place against a supporting surface by reason of tension induced in certain of its component elements. This feature is of particular importance where the hat rack is used in an automobile because of the tendency of a car body to vibrate and thus dislodge an article pinned to the interior fabric in conventional fashion.

It is a further object of the invention to provide a hat rack having a resilient construction that enables it to firmly grip a hat or object placed in it, such being of considerable advantage where vibration or other cause induces the slipping or working loose of an article from its desired position in an automobile.

It is another object of the invention to provide a hat rack having a hinged action that affords convenient and secure engagement of a hat placed within the hat rack.

It is still another object of the invention to provide a hat rack for an automobile or the like that is conveniently carried or stored when not in use.

These and such other objects as may hereinafter appear are attained in the embodiments of the invention shown in the accompanying drawings, wherein:

Figure 1 is a perspective view of a hat rack embodying the invention as it is before attachment to a supporting surface;

Figure 2 is an elevational view of an end of the hat rack shown in Figure 1 and illustrating the hat rack engaging a supporting surface and holding a hat;

Figure 3 is an enlarged, fragmentary view of a portion of the hat rack shown in Figure 1 and depicting a manner of pin arrangement utilized in the invention; and, Figure 4 is a perspective view of a modified form of hat rack embodying the invention before such has been secured to a supporting surface.

Considering in detail the embodiment of the invention illustrated in Figures 1 through 4 of the drawing, resilient wire hat rack 10 comprises two complementary shaped rack members 11 and 12 which are disposed oppositely to each other in assembled relationship. Each of the opposed rack members has flat portions 13 and 14, respectively, which are in the same plane and are adapted to lie flat against a supporting surface 16, as shown in Figure 2. The rack members each include transverse portions 17 and 18 which are suitably shaped for the efficient gripping and holding of a hat.

The rack members 11 and 12 are complementary to each other and are substantially similar in configuration. Thus, rack member 11 as shown in Figure 1 includes two flat portions 13 with transverse portion 17 therebetween. In this embodiment, transverse portion 17 has a spacer 21 extending perpendicularly from each of the flat portions and a spacer 23 extending perpendicularly from each of the spacers 21. The spacers 21 and 23 extend for a distance suitable for the convenient accommodation of a hat brim thickness and width, respectively. From the spacers 23, a spacer 25 extends perpendicularly for a distance sufficient to raise a hat brim from the plane of spacers 23 so as to facilitate engagement of a hat in the hat rack 10. The spacers 25 are connected by a transverse hanger 27 which contacts and hold the hat brim. Rack member 12 similarly has spacers 22, 24, and 26 as well as a transverse hanger 28.

The rack members 11 and 12 thus described are adapted to be secured to a supporting surface 16 as shown in Figure 2. Such supporting surface 16 is a pin-receiving material such as the interior of a roof of an automobile with which the hat rack embodying the invention is particularly adapted for use. The securement of the rack members to the supporting surface is accomplished by pins 31 and 32 having a sharpened end suitable for penetration of the pin-receiving material. The pins project outwardly from the plane of the flat portions 13 and 14 sufficiently for rapid and convenient engagement with the supporting surface. It is important that the direction of projection of the pins 31 and 32 be toward each other so that each pin is directed to the opposed rack member. Thus, when the rack members 11 and 12 are in assembled relationship, pins 31 are pointed toward the rack member 12 and pins 32 are pointed toward the rack member 11.

The complementary rack members 11 and 12 are held in assembled relationship by tension means such as contraction springs 33. Each of the springs engage a flat portion 13 and 14 so that the opposed rack members are connected to each other. Each spring 33 is attached to a suitably formed inner end 34 of a flat portion as shown in Figures 3 and 4. The springs are of a length such that when the hat rack is positioned for securement to the supporting surface 16 the springs tend to urge the opposed rack members together.

The projection of the pins 31 and 32 proceeds from a point 36 spaced from the point of attachment at 34 of the springs 33. With the point of projection 36 of the pins thus being spaced from the point of attachment 34, the distance between the points 34 and 36 provides a leverage arm 37 which enables each spring to hold its attached flat portions securely against the supporting surface 16. Any tendency of the weight of the hat or other object held in the hat rack to pull the rack members down and away from the supporting surface 16 is resisted by the pull of the springs. The leverage provided by arm 37 pivoting at point 36 tends to pull each point 34 tightly against the supporting surface.

In the wire hat rack illustrated in Figures 1, 2, and 3, the pins 31 and 32 comprise the sharpened ends of the rack members 11 and 12 which are bent at the point of projection 36 so that the pins are directed somewhat outwardly and toward the opposing rack member.

In utilizing the hat rack 10 that has been thus described, the rack members 11 and 12 are pulled away from each other a distance sufficient to accommodate a hat or other object to be held by the hangers 27. With the flat portions of the hat rack uppermost, the pins of one of the rack members, such as, for example, rack member 11, are forced into the supporting surface 16 until the flat portions 13 adjacent to the pins 31 engage the supporting surface. The opposing rack member 12 is then spaced slightly further from each member 11 to compensate for the inward travel of pins 32 and the latter are forced into the surface 16. The action of the contraction spring 33 tends to pull the rack members together so that leverage arm 37 pivots at projection point 36 and causes the flat portions of both rack members to securely engage the supporting surface. A hat or other object is then slid endwise onto the hangers 27 and 28 of the transverse portions and held in place by the action of the contraction springs which urge hangers 27 and 28 upward and inward against the bottom of the hat brim and the side of the hat crown.

Where the pins 31 and 32 are adjacent to the spacers 21 and 22, a hinge effect is provided which enables the hat to be placed into the hat rack by pulling one of the rack members down, inserting the hat brim into the other rack member, and returning the first rack member up and against the lower surface of the hat brim. In so doing, the flat portion of the rack member pulled down pivots around the bends adjacent the lead lines 13 and 14 of Figure 1 and 63 of Figure 4 without any resistance from a part of the flat portion between such point and either of the spacers 21 and 22. Thus, where the rack members are spaced from each other a proper distance, the hanger of the rack member pulled down will be returned to a position where it snugly contacts the hat at the juncture of the hat brim and hat crown. The slight pressure provided by this snug contact contributes to the holding of the hat by the hat rack in the presence of vibration or other cause tending to dislodge the hat from its proper position in the rack.

A modified form of hat rack embodying the invention is shown in Figure 4 wherein the wire hat rack 10 includes rack members 51 and 52 to which are attached contraction springs 33. The complementary rack portions 51 and 52 comprise flat portions 53 and 54 which are in one plane and are of endless configuration. The flat portions have rigidly affixed thereto transverse portions 57 and 58. As shown in Figure 4, the sharpened ends of the wire transverse portions continue beyond their connection to the flat portions to provide pins 61 and 62. The pins project beyond the plane of the flat portions and point in the direction of the opposing rack member.

In the embodiment shown in Figure 4, the point of projection 63 of the pins is substantially spaced from the point of attachment 64 of the springs to the rack members. Thus, considerable leverage is exerted upon the flat portions by the springs to maintain the hat rack in proper holding position. The fact that the point of projection of the pins is on the outer perimeter of the flat portions makes possible the hinge effect previously described.

This form of hat rack is utilized similarly to that shown in Figures 1 through 3 with the hat or other object to be held being inserted either endwise or by pulling down one rack member. The endless configuration of the flat portions 53 and 54 contribute to the rigidity of the hat rack and to its securement to the supporting surface 16. If desired, the pins 61 and 62 may be formed of separate pin elements that are welded or otherwise affixed to the flat portions 53 and 54.

While I have shown certain preferred embodiments hereinabove, it will be understood that variations may be made therein within the scope of the appended claims.

I claim:

1. A hat rack for securement to the fabric lining of an automobile comprising two like, wire frames, each frame comprising a wire having a central hat brim supporting portion lying in a plane, a bend at each end of said portion away from the plane, a second bend extending each end in a plane substantially parallel to the first, a third bend extending each end of the wire back parallel to the plane of the central portion, a fourth bend directing the ends of the wire back toward the central portion thereof, a 180° bend in each end of the wire forming a bight, a second 180° bend directing the end back toward the central portion and slightly upwardly, the end having a sharp point to penetrate fabric, and contraction springs having their ends respectively hooked to opposed bights in the wire frames.

2. A hat rack for securement to the fabric lining of an automobile comprising two like wire frames, each frame comprising a wire having a central hat brim supporting portion lying in a plane, a bend at each end of said portion away from the plane, a second bend extending each end in a plane substantially parallel to the first, a third bend extending each end of the wire back parallel to the plane of the central portion, a fourth bend directing the ends of the wire back toward the central portion thereof, a rectangular member attached to each wire frame at the fourth bend lying in a plane substantially parallel to the central portion of each wire frame, the end of each wire having a sharp point to penetrate fabric and being directed slightly upwardly, and contraction springs having their ends respectively hooked to said rectangular members.

References Cited in the file of this patent

UNITED STATES PATENTS

| 2,438,659 | Fowler | Mar. 30, 1948 |
| 2,444,322 | Ajax | June 29, 1948 |

FOREIGN PATENTS

| 9,588 | Great Britain | of 1902 |
| 354,996 | Great Britain | Aug. 20, 1931 |